United States Patent
Kim

(10) Patent No.: US 10,470,159 B2
(45) Date of Patent: Nov. 5, 2019

(54) METHOD AND APPARATUS FOR TRANSMITTING AND RECEIVING MESSAGE BASED ON FRONTHAUL INTERFACE

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/969,858

(22) Filed: May 3, 2018

(65) Prior Publication Data

US 2018/0324752 A1 Nov. 8, 2018

(30) Foreign Application Priority Data

May 8, 2017 (KR) .................. 10-2017-0057299
Mar. 29, 2018 (KR) .................. 10-2018-0036753

(51) Int. Cl.
| | | |
|---|---|---|
| *H04W 68/00* | (2009.01) | |
| *H04W 68/02* | (2009.01) | |
| *H04W 72/04* | (2009.01) | |
| *H04W 24/02* | (2009.01) | |
| *H04W 76/27* | (2018.01) | |

(52) U.S. Cl.
CPC .......... *H04W 68/02* (2013.01); *H04W 72/042* (2013.01); *H04W 24/02* (2013.01); *H04W 76/27* (2018.02)

(58) Field of Classification Search
CPC . H04W 68/02; H04W 68/005; H04W 72/042; H04W 76/27; H04W 24/02; H04W 88/085
See application file for complete search history.

(56) References Cited

U.S. PATENT DOCUMENTS

| | | | | |
|---|---|---|---|---|
| 2018/0279182 A1* | 9/2018 | Sang | ...................... | H04L 5/0048 |
| 2018/0279358 A1* | 9/2018 | Babaei | .............. | H04W 72/0453 |
| 2018/0302878 A1* | 10/2018 | Byun | ..................... | H04W 68/02 |
| 2018/0368205 A1* | 12/2018 | Park | ....................... | H04L 5/0048 |

* cited by examiner

*Primary Examiner* — Barry W Taylor
(74) *Attorney, Agent, or Firm* — IP Legal Services, LLC

(57) ABSTRACT

Provided is a method for transmitting and receiving message through a message transfer technology that uses a fronthaul interface between a central unit (CU) and a distributed unit (DU) configuring a 5G base station. The method includes generating a downlink message to be transmitted to one or more DUs associated with the CU, transmitting the downlink message to the one or more DUs through a fronthaul interface, and receiving an uplink message from the one or more DUs through the fronthaul interface.

14 Claims, 11 Drawing Sheets

METHOD AND APPARATUS FOR TRANSMITTING AND RECEIVING MESSAGE BASED ON FRONTHAUL INTERFACE

CROSS REFERENCE TO RELATED APPLICATION

This application claims priority from Korean Patent Application Nos. 10-2017-0057299 and 10-2018-0036753, filed on May 8, 2017 and Mar. 29, 2018, which are hereby incorporated by reference for all purposes as if fully set forth herein.

BACKGROUND OF THE INVENTION

1. Field of the Invention

The present disclosure is a technology related to a downlink and uplink message transmission and reception procedure in a base station using a 5G technology that is a next generation wireless access technology. Specifically, the present disclosure relates to a message transfer technology using a fronthaul interface between a central unit and a distributed unit, which are constituent elements of a 5G base station.

2. Description of the Related Art

As a communication system is developed, various wireless terminals have been introduced to consumers such as companies and individuals.

In a mobile communication system such as Long Term Evolution (LTE), LTE-Advanced, and 5G of a current $3^{rd}$ Generation Partnership Project (3GPP) series, a communication system has been required to transmit and receive large amount and various type data at a high speed beyond a voice oriented service. In addition, a technology for a next generation radio access network has been developed for accommodating data transmission and reception of more terminals and providing higher quality of service (QoS) after the LTE-Advanced. For example, a 5G network has been developed based on the 3GPP.

In addition, the 5G requires various transmission speeds, high reliability, low delay degree, and various services. Such requirements are for providing a customized service by a place or a terminal. For satisfying such requirements and providing a customized service, various types of devices for providing services (for example, base stations) are required.

To this end, it is necessary to dynamically configure such service providing devices for each place or each service. In addition, in a case of various types of base stations, it is very important to guarantee mutual compatibility between base station devices.

In such a situation, it is necessary to conduct a research for a transmission and reception protocol between constituent elements inside the base station for transmitting a downlink message to a terminal and receiving an uplink message. That is, unlike a typical LTE base station, the 5G base station includes constituent elements dynamically installed in different places and performing different functions. Therefore, there is a need for developing a message transmission and reception procedure between constituent elements of a base station, which was not required in the related art.

SUMMARY OF THE INVENTION

In the above-described background, the present disclosure proposes a message transmission and reception procedure and transmission and reception information between each of constituent elements when a base station is configured of a plurality of constituent elements.

In addition, the present disclosure proposes a specific procedure of transferring a radio resource control (RRC) message, a paging message, and system information based on a fronthaul interface between internal constituent elements configuring a base station.

An embodiment for resolving the above-described problems provides a method of transmitting and receiving a message by a central unit (CU) configuring a base station. The method includes generating a downlink message to be transmitted to one or more distributed units (DUs) associated with the CU, transmitting the downlink message to the one or more DUs through a fronthaul interface, and receiving an uplink message from the one or more DUs through the fronthaul interface.

In addition, an embodiment provides a central unit (CU) configuring a base station that transmits and receives a message. The CU includes a controller configured to generate a downlink message to be transmitted to one or more distributed units (DUs) associated with the CU, a transmitter configured to transmit the downlink message to the one or more DUs through a fronthaul interface, and a receiver configured to receive an uplink message from the one or more DUs through the fronthaul interface.

According to the present disclosure, a fronthaul interface for stably providing a service satisfying 5G requirements is designed in an open direction, and thus an efficient linkage between base stations is possible.

In addition, according to the present disclosure, by the efficient linkage between the base stations, cost for constructing and operating the base station can be reduced and a stable network connection can be provided.

DETAILED DESCRIPTION OF THE EXEMPLARY EMBODIMENTS

Figure 1:
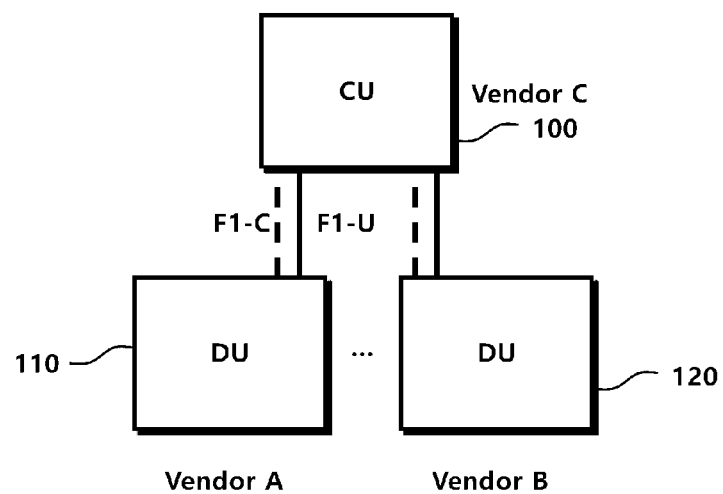
FIG. 1 is a diagram illustrating an example of a base station having a split structure and a fronthaul interface according to an embodiment.

Hereinafter, some embodiments of the present disclosure will be described in detail with reference to the accompanying drawings. In adding reference numerals to elements in each drawing, the same elements may have the same reference numerals, if possible, even though the elements are shown in different drawings. Further, in the following description of the present disclosure, a detailed description of known configurations or functions incorporated herein will be omitted when it is determined that the description may make the subject matter of the present disclosure rather unclear.

In the present specification, a machine type communication (MTC) terminal may refer to a terminal that supports low cost (or low complexity), a terminal that supports coverage enhancement, or the like. In the present specification, the MTC terminal may refer to a terminal that supports low cost (or low complexity) and coverage enhancement, or the like. Alternatively, in the present specification, the MTC terminal may refer to a terminal that is defined as a specific category for supporting low cost (or low complexity) and/or coverage enhancement.

In other words, in the present specification, the MTC terminal may refer to a newly defined $3^{rd}$ Generation Partnership Project (3GPP) Release-13 low cost (or low complexity) user equipment (UE) category/type that performs a Long-Term Evolution (LTE)-based MTC-related operation. Alternatively, in the present specification, the MTC terminal may refer to a UE category/type that is defined in or before 3GPP Release-12 that supports an enhanced coverage or supports low power consumption in comparison with the existing LTE coverage or may refer to a newly defined Release-13 low cost (or low complexity) UE category/type.

A wireless communication system in the present disclosure is widely disposed for providing various communication services such as a voice service and a packet data service. The wireless communication system includes a UE and a base station (BS) or an evolved node-B (eNB). The UE (User Equipment) in the present specification is a comprehensive concept that means a terminal in wireless communication, and the UE should be construed as a concept including UE in wideband code division multiple access (WCDMA), LTE, high speed packet access (HSPA), or the like, and a mobile station (MS), a user terminal (UT), a subscriber station (SS), a wireless device, and the like in global system for mobile communication (GSM).

A BS (e.g., a cell) may generally refer to a station where communication with a UE is performed, and such a BS (e.g., cell) may be referred to as another term such as a node-B, an eNB, a sector, a site, a base transceiver system (BTS), an access point, a relay node, a remote radio head (RRH), a radio unit (RU), and a small cell.

That is, the BS or the cell in the present specification should be construed as a comprehensive meaning indicating some area or function covered by a BS controller (BSC) in CDMA, a node-B in WCDMA, an eNB in LTE, a sector (site), or the like, and means inclusively all of various coverage areas such as a megacell, a macrocell, a microcell, a picocell, a femtocell, a relay node, an RRH, an RU, and a small cell communication range.

Each of the above-described various cells has a BS that controls a corresponding cell. Thus, the BS may be construed in two ways: i) the BS may be a device that provides a megacell, a macrocell, a microcell, a picocell, a femtocell, and a small cell in association with a wireless area, or ii) the BS may indicate a wireless area itself. In item i), a BS may be all devices that interact with one another and controlled by one identical entity to configure a wireless area, or cooperating each other to configure a wireless area to. According to a configuration type of the wireless area, a BS may include an eNB, an RRH, an antenna, an RU, a low power node (LPN), a point, a transmission/reception point, a transmission point, a reception point, or the like. In item ii), a BS may be a wireless area itself that receives or transmits a signal from a perspective of a UE or a neighboring BS.

Thus, the BS may include the megacell, the macrocell, the microcell, the picocell, the femtocell, the small cell, the RRH, the antenna, the RU, the LPN, the point, the eNB, the transmission/reception point, the transmission point, and the reception point.

In the present specification, the UE and the BS are used as two inclusive transmitting and receiving subjects to implement the technology or technical spirit described in the present specification, and the UE and the BS are not limited to a predetermined term or word. The UE and the BS are used as two (uplink (UL) or downlink (DL)) inclusive transmitting and receiving subjects to implement the technology or technical spirit described in the present specification and are not limited to a predetermined term or word. Here, the UL refers to a scheme for the UE to transmit and receive data to and from the BS, and the DL refers to a scheme for the BS to transmit and receive data to and from the UE.

A multiple access scheme may be unrestrictedly applied to a wireless communication system. Various multiple access schemes such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, and OFDM-CDMA, may be used. An embodiment of the present disclosure may be applied to resource allocation in an asynchronous wireless communication field that evolves into LTE/LTE-Advanced through GSM, WCDMA, and HSPA, and may be applied to resource allocation in a synchronous wireless communication field or the like that evolves into CDMA, CDMA-2000, and Ultra Mobile Broadband (UMB). The present disclosure should not be construed to be restricted to or limited to a specific wireless communication field and should be construed as including all technical fields to which the spirit of the present disclosure may be applied.

UL transmission and DL transmission may be performed using one of i) a time division duplex (TDD) scheme that performs transmission using different times and ii) a frequency division duplex (FDD) scheme that performs transmission using different frequencies.

In addition, in a system such as LTE and LTE-Advanced, the UL and the DL are configured based on one carrier or a pair of carriers to configure a standard. The UL and the DL transmit control information through a control channel such as a physical DL control channel (PDCCH), a physical control format indicator channel (PCFICH), a physical hybrid ARQ indicator channel (PHICH), a physical UL control channel (PUCCH), and an enhanced physical DL control channel (EPDCCH) and are configured with a data channel such as a physical DL shared channel (PDSCH) and a physical UL shared channel (PUSCH) so as to transmit data.

Meanwhile, the control information may be transmitted using an enhanced PDCCH or an extended PDCCH (EPD-CCH).

In the present specification, a cell may refer to a coverage of a signal transmitted from a transmission/reception point, a component carrier having the coverage of the signal transmitted from the transmission/reception point (transmission point or transmission/reception point), or the transmission/reception point itself.

In the specification, a wireless communication system may be i) a coordinated multi-point transmission/reception system (CoMP system) in which two or more transmission/reception points cooperate to transmit a signal, a coordinated multi-antenna transmission system or ii) a coordinated multi-cell communication system. The CoMP system may include at least two multiple transmission/reception points and terminals.

The multiple transmission/reception points may be at least one RRH that is connected to the BS or the macrocell (hereinafter, referred to as 'eNB') and the eNB through an optical cable or an optical fiber to be controlled in a wired manner, and has high transmission power or low transmission power in a macrocell area.

Hereinafter, the DL refers to communication or a communication path from multiple transmission/reception points to a terminal, and the UL refers to communication or a communication path from the terminal to the multiple transmission/reception points. In the DL, a transmitter may be a part of the multiple transmission/reception points and a receiver may be a part of the terminal. In the UL, a transmitter may be a part of the terminal and a receiver may be a part of the multiple transmission/reception points.

Hereinafter, a situation in which a signal is transmitted and received through a channel such as a PUCCH, a PUSCH, a PDCCH, an EPDCCH, or a PDSCH will also be expressed as 'transmission and reception of the PUCCH, the PUSCH, the PDCCH, the EPDCCH, or the PDSCH'.

In addition, hereinafter, a description of transmitting or receiving a PDCCH or a description of transmitting or receiving a signal through the PDCCH may be used as a meaning including transmitting or receiving an EPDCCH or transmitting or receiving a signal through the EPDCCH.

That is, a physical DL control channel described below may mean the PDCCH, mean the EPDCCH, or mean both the PDCCH and the EPDCCH.

In addition, for convenience of description, the EPDCCH, which is an embodiment of the present disclosure, may also be applied to a portion described with the PDCCH, and the PDCCH may also be applied to a portion described with the EPDCCH as an embodiment.

Meanwhile, high layer signaling described below includes radio resource control (RRC) signaling which transmits RRC information including an RRC parameter.

The eNB performs DL transmission to terminals. The eNB may transmit a PDSCH which is a main physical channel for unicast transmission, DL control information such as scheduling required to receive the PDSCH, and a PDCCH for transmitting scheduling approval information for transmission through an UL data channel (for example, a PUSCH). Hereinafter, transmission and reception of a signal through each channel will be described as transmission and reception of a corresponding channel.

As representative usage scenario in a new radio (NR) that is recently under discussion in 3GPP, Enhanced Mobile Broadband (eMBB), Massive Machine Type Communication (mMTC), and Ultra Reliable and Low Latency Communication (URLLC) have been proposed.

In the present specification, a frequency, a frame, a subframe, a resource, a resource block, a region, a band, a sub-band, a control channel, a data channel, a synchronization signal, various reference signals, various signals, and various messages related to the NR may be interpreted as various meanings used in the past, present, or future.

For example, the LTE and the NR in the specification means different wireless access techniques. A new wireless access technology being discussed in Release-15 of 3GPP is described as the NR. The NR may include various differences such as frame structure, channel, and core network (CN) technologies different from the LTE, and various functions for wireless transmission, high speed, and large capacity data transmission may be added in the NR.

Hereinafter, for convenience of understanding, the typical wireless access technology will be described as the LTE and the new wireless access technology being discussed in 3GPP will be described as the NR. In addition, the BS may be an eNB using the LTE technology, may be a gNB using the NR technology, and separately described as occasion demands.

In addition, a cell in the specification is used as a term including a radio path, a radio link, a carrier, and the like for transmitting data, and one BS may transmit and receive data through a plurality of cells. Alternatively, a terminal may transmit and receive data using a plurality of cells through cells controlled by two BSs. As described below, in a case where one BS controls a plurality of cells, a carrier merger will be described. When a plurality of cells is controlled by two or more BSs, a dual connectivity will be described.

In addition, a BS or a 5G BS in the specification may be described as a meaning including a central unit (CU) and at least one distributed unit (DU). For example, in a 5G radio access network (RAN), the CU is centrally disposed, and DUs are distributed and installed in each cell site. As occasion demands, the BS will be described as a meaning both including the CU and the DUs connected with each other through a fronthaul interface by including a network function of the CU and a network function of the DU. Alternatively, the BS may be divided into the CU, the DU, and an RU that is in charge of a radio frequency (RF) function.

Meanwhile, the CU and the DU are arbitrary selected terms for convenience of description based on a position where a corresponding unit is installed, and the CU and the DU are not limited to the corresponding terms. For example, disposition positions (e.g., installation positions) and disposition functions of the CU and the DU may be different according to a wireless network construction scenario and the like. In addition, names thereof may vary according to a manufacturer of each unit. Therefore, the CU should be understood as a meaning including various names such as a data processing unit, a local unit, a central office unit, and a virtualization server. In the same manner, the DU should be understood as a meaning including various names such as a cell site unit, a RU, and an end unit. That is, the CU and the DU perform individual BS functions, mean individual units in which BS functions are distributed, and names thereof are not limited.

In addition, the fronthaul interface is used as a term meaning an interface of the CU and the DU, and the fronthaul interface may be distinguished from a backhaul interface that is an interface connecting a CN and the CU with each other. Of course, the fronthaul interface is also an arbitrary term for distinguishing the fronthaul interface from the backhaul interface, means an interface for connecting the CU and the DU, and a name thereof is not limited.

The following 5G or 5G communication method should be understood as a generic term for a communication method under research to transmit more data faster than the LTE-Advanced. That is, the 5G may mean a specific communication method, or the 5G may mean some function or the entire communication system for large capacity super-high-speed data communication. Therefore, the 5G in the specification should be understood as a term for a communication system or a communication function that performs large capacity super-high-speed communication.

The typical LTE wireless BS may be divided into a data unit that processes a digital function of a baseband and a RU that processes an RF function. A data unit is mainly installed in a concentrated locality and performs physical layer (PHY), multiplexed analog components (MAC), radio link control (RLC), packet data convergence protocol (PDCP), and RRC functions. An RU is installed in a cell site and performs an RF function. The DU and the RU are connected with each other through an interface based on Common Public Radio Interface (CPRI). However, the standardization between the DU and the RU is incomplete. Thus, compatibility is guaranteed because device manufacturers are different. Accordingly, there are many restrictions in constructing and operating the BS.

In order to solve such problems, it is necessary to design a fronthaul interface inside the BS in a standard-based open type with reference to a necessary matter by many small cell BSs, to stratify requirements of a high frequency band, a high transmission speed, high reliability, and a low delay degree, and to provide various services in a next generation wireless communication technology.

Therefore, according to at least one embodiment, a procedure may be provided for transmitting and receiving messages based on a fronthaul interface between a CU and a DU of a 5G BS, and a wireless protocol procedure and an apparatus may be provided for the message transmission and reception procedure.

FIG. 1 is a diagram illustrating a BS having a split structure and a fronthaul interface according to an embodiment.

Referring to FIG. 1, a 5G RAN (RAN or NG-RAN, hereinafter referred to as the BS) may include a CU 100 and DUs 110 and 120, which are separated and installed at different locations. The DU 100 is installed in a locality. The DUs 110 and 120 are installed in a corresponding cell site. In this case, the DUs 110 and 120 may include an RF or antenna function. Alternatively, the RF or antenna function may be separated from the DUs 110 and 120. In a case where the RF or antenna function is separated from the DUs 110 and 120, the BS may have a three-stage split structure of the CU 100, the DUs 110 and 120, and an RFU (RF/antenna).

Hereinafter, a linkage interface of a fronthaul section between the CU 100 and the DUs 110 and 120 is described as a fronthaul interface or an F1. For example, a control plane (CP) interface is described as an F1-C, and a user plane (UP) interface is described as an F1-U. In addition, the fronthaul is described as a midhaul as occasion demands. As described above, such terms are for convenience of description and ease of understanding and may be replaced with other terms having a corresponding function.

That is, the CU 100 of the BS may be connected to one or more DUs 110 and 120 configuring the same BS. In addition, the CU and the DUs 110 and 120 may be manufactured or operated by different vendors. Alternatively, the CU 100 and the DUs 110 and 120 may be manufactured or operated by the same vendor. For example, the CU 100 may be manufactured or operated by a vendor C, the DU 110 may be manufactured or operated by a vendor A, and another DU 120 may be manufactured or operated by a vendor B. Even in this case, the CP interface of the CU 100 and the DUs 110 and 120 may be configured through the F1-C, and the UP interface of the CU 100 and the DUs 110 and 120 may be configured through the F1-U.

In addition, one or more DUs 110 and 120 may be connected to one CU 100, and the DUs 110 and 120 may be connected to one CU 100 or a plurality of CUs.

Meanwhile, in order to identify the CU 100 and the DUs 110 and 120, a CU ID and a DU ID that are unique identifiers may be used. For example, the length of the CU ID and the length of the DU ID may be different from each other.

For example, it is necessary to distinguish each device type of the CU 100, the DU 110, and the DU 120. For example, the CU 100 and the DUs 110 and 120 may be distinguished from each other through an NG-RAN split ID or CU type ID and DU type ID values. For example, functions or types of the CU 100 and the DUs 110 and 120 configuring the BS may be distinguished from each other through corresponding identification (ID) information similar to that a NG RAN split ID indicates a PDCP-RLC split structure when the NG RNA split ID is 1 or that the NG-RAN split ID indicates an MAC-PHY split structure when the NG RNA split ID is 2.

As another example, type ID information may be set for distinguishing functions of each unit. For example, when a CU type ID is set to 1, a PDCP or higher hierarchy is accommodated, and when DU type ID is set to 1, an RLC or lower hierarchy is accommodated.

Meanwhile, in a case where one DU is connected to a plurality of CUs, a CU group ID (or CU pool ID) may be used. For example, when the CU group ID is 1, the CU group ID indicates a set (CU group) of a virtual CU device configured of a CU ID #1, a CU ID #3, and a CU ID #4. In addition, one CU among the CUs belonging to the same CU group may be designated as a master CU, and the remaining CUs may be designated as slave CUs. For example, the master CU and the slave CUs may be allocated or changed in a fixed manner or a dynamic manner for purposes such as a BS construction method, a load distribution, and an obstacle response.

A wireless cell may be configured by one DU or two or more DUs. Such a cell having a large coverage is more suitable for a terminal having high mobility and is useful for constructing a wide area cell for a vessel, a high-speed train, a subway, a drone, an airplane, or the like.

Hereinafter, the present disclosure will mainly describes based on the BS including the CU 100 and the DUs 110 and 120, as shown in FIG. 1.

Figure 2:
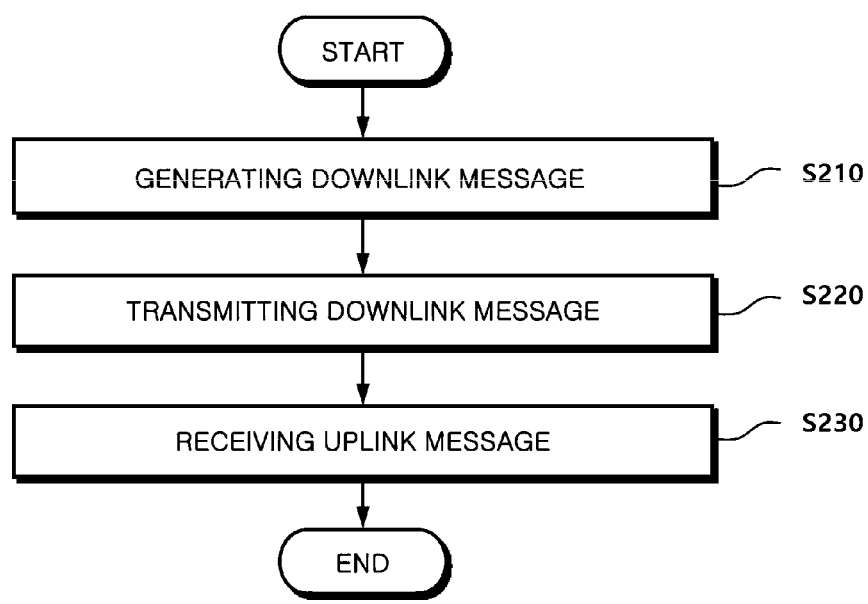
FIG. 2 is a flowchart for describing an operation of a central unit of a base station according to an embodiment.

FIG. 2 is a flowchart for describing an operation of a CU of a BS according to an embodiment.

Referring to FIG. 2, for transmitting and receiving a message, a CU of a BS may perform an operation of generating a DL message to be transmitted to one or more DUs associated with the CU (S210). For example, the CU of the BS may generate the DL message to be transmitted to a terminal. As described above, when the BS has a split structure including the CU 100 and the DUs 110 and 120, the CU should transmit the DL message to the terminal through at least one of the DUs 110 and 120. Therefore, the CU may generate the DL message to be transmitted to the one or more DUs of the BS in association with the CU.

For example, in a case where the CU 100 is configured in association with one DU 110, the CU 100 transfers the DL message to the DU 110 through a fronthaul interface and the DU 110 transfers the DL message to the terminal through a wireless interface.

The CU 100 may perform an operation of transmitting the DL message to the one or more DUs 110 and 120 through the fronthaul interface (S220). The CU 100 transfers the DL message to at least one of the DUs 110 and 120 through an interface between the CU 100 and the DUs 110 and 120. For example, the DL message may be transferred to the DU through an F1 interface.

For example, the DL message may be an RRC message transfer message for transmitting an RRC message to the terminal. For example, the CU 100 may transmit a DL RRC message transfer message for transferring the RRC message of a DL PDCP protocol data unit (PDU) to at least one of the DUs 110 and 120 through an F1 application protocol (FLAP).

For example, the DL RRC message transfer message may include at least one of CU terminal F1AP ID information for identifying the terminal on the fronthaul interface in the CU 100, DU terminal F1AP ID information for identifying the terminal on the fronthaul interface of a corresponding one of the DUs 110 and 120, and an RRC container including radio bearer ID information and message information transmitted to the terminal. The radio bearer ID information may be a service request block (SRB) ID or a data request block (DRB) ID. For example, the above-described information included in the DL RRC message transfer message may be included in an RRC container IE and may be transferred. In this case, the DU 110 or 120 may transmit the received RRC container information to a terminal having an identifier indicated by the DL RRC message transfer message to transmit the RRC message to the terminal.

For another example, the DL message may include paging information for causing a DU to perform a paging procedure on a terminal in a cell indicated in paging cell list information. For example, the paging information may include at least one of terminal identity index value (UE identity index value) information for calculating a paging frame, terminal paging identity information for identifying the terminal in a RAN (RAN UE paging identity information), CN terminal paging identity information for identifying the terminal in a CN (CN UE paging identity information), and the paging cell list information. In this case, the DU may transmit a paging message to the terminal through the cell indicated by the paging cell list information using the received DL message.

For still another example, the DL message may be a system information transfer instruction message for instructing a DU to broadcast system information. In this case, the DU may broadcast the system information to the inside of the cell according to the system information transfer instruction message.

Meanwhile, the CU 100 may perform an operation of receiving an UL message from the one or more DUs 110 and 120 through the fronthaul interface (S230). For example, the CU 100 may receive the UL message that is transmitted from the terminal, through at least one of the DUs 110 and 120.

For example, the UL message may include an UL RRC message transfer message for receiving an RRC message configured of an UL PDCP PDU from the DU through the F1AP. For example, the UL RRC message transfer message may include at least one of CU terminal F1AP ID information for identifying a terminal on the fronthaul interface in the CU, DU terminal F1AP ID information for identifying the terminal on the fronthaul interface in the DU, and an RRC container including radio bearer ID information and message information received from the terminal. The radio bearer ID information may include an SRB ID or a DRB ID to which the corresponding RRC message is transferred.

As described above, the CU and the DUs of the BS may exchange the RRC message, the system information, and the paging information that are to be transmitted to the terminal, through the F1 interface.

A 5G BS baseband function is implemented by a virtualization method with PHY, MAC, PLC, PDCP, service data adaptation protocol (SDAP), and RRC wireless protocol hierarchies or an independent network function (RAN function (RANF)). High rank protocol and low rank protocol functions may be suitably separated and implemented in the CU and the DUs. Of course, a performance of detailed functions for each RANF may vary.

Hereinafter, a split structure of a BS according to embodiments will be described with reference to the drawing.

Figure 3:
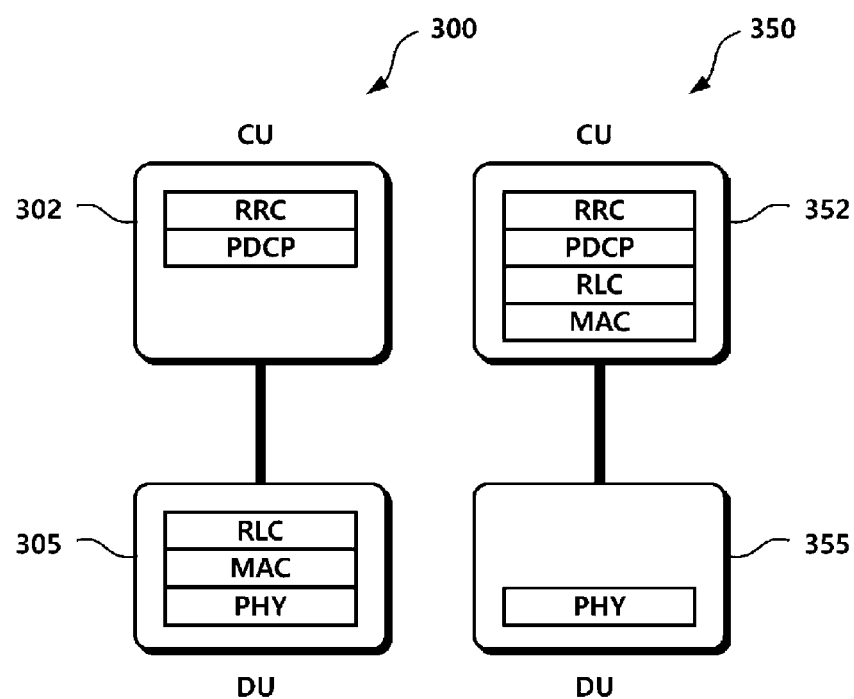
FIG. 3 is a diagram illustrating a base station including a central unit (CU) and a distributed unit (DU) according to an embodiment.

FIG. 3 is a diagram illustrating a BS having a split structure of a CU and a DU according to at least one embodiment.

The CU-DU split structure of a BS may be configured in various types. Referring to FIG. 3, in the case of a BS 300, the BS 300 has a split structure of a CU 302 and a DU 305, which are physically separated and installed at different locations. The CU 302 may be configured to perform RRC and PDCP network functions, and the DU 305 may be configured to perform RLC, MAC, and PHY network functions. Alternatively, in case of the BS 350, the BS 350 has a split structure of a CU 352 and a DU 355, which are physically separated and disposed at different locations. The CU 352 may be configured to perform RRC, PDCP, RLC, and MAC network functions, and the DU 355 may be configured to perform only a PHY network function. In addition, some functions which allow an RLC or a MAC to be processed in non-real time may be configured in a CU, and some functions which allow the RLC or the MAC to be processed in real time is required may be distributed and configured in a DU.

As described above, the CUs 302 and 352 may be configured to perform at least one network function among the RRC, PDCP, RLC, and MAC network functions, and the DUs 305 and 355 may be configured to perform at least one network function among the RLC, MAC, and PHY network functions. Alternatively, in the case of an integrated device which is a device having an RF and antenna, the RF also may be included in a DU. Therefore, various types of BS split structure may be implemented in addition to the above-described BS 300 (e.g., type 1) and the BS 350 (e.g., type 2). For example, the RLC and MAC layers have similar packet processing functions such as packet combination (packet concatenation, multiplexing, assembling, or the like), division (packet segmentation, de-multiplexing, or the like), packet reordering, and packet re-transmission. Therefore, the RLC and MAC layers may be combined with each other, or similar functions of the RLC and MAC layers may be combined with each other for high performance packet processing. Alternatively, a specific network function may be removed or not be used as occasion demands.

Such a BS split structure may be variously configured as occasion demands.

For example, the BS 300 (e.g., type 1) is easier to be linked between 5G BS equipment and LTE/Wi-Fi BS equipment through the PDCP, and the BS 300 (e.g., type 1) requires a small capacity fronthaul data transmission is required. Accordingly, the BS 300 (e.g., type 1) is more suitable for an mmWave BS for a broadband transmission.

The BS 350 (e.g., type 2) is capable of short transmission delay and fast radio resource scheduling but a large capacity fronthaul data transmission is required. Therefore, the BS 350 (e.g., type 2) is more suitable for a BS using a frequency less than or equal to 6 GHz.

Meanwhile, the DUs 305 and 355 may include radio resource management (RRM) functions in addition to the CUs 302 and 352, for support for mobility or the like. Alternatively, a network function (for example, RRC) corresponding to a RAN CP may be implemented in all of the CUs 302 and 352 and the DUs 305 and 355.

Figure 4:
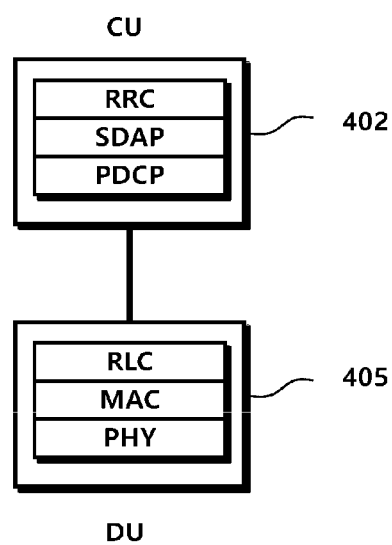
FIG. 4 is a diagram illustrating a base station including a CU and a DU according to another embodiment.

FIG. 4 is a diagram illustrating a BS having a split structure of a CU and a DU according to another embodiment.

Referring to FIG. 4, the BS has a split structure of a CU 402 and a DU 405. The CU 402 may be configured to perform RRC, SDAP, and PDCP network functions, and the DU 405 may be configured to perform RLC, MAC, and PHY network functions. For example, an SDAP function may convert 5G quality of service (QoS) flows received from a 5G CN into a radio bearer that may be processed by the BS, and the protocol may be selectively operated as occasion demands.

Especially, the RLC and MAC layers have similar packet processing functions, such as packet combination (packet concatenation, multiplexing, assembling, or the like), packet division (packet segmentation, de-multiplexing, or the like), packet reordering, and packet re-transmission. Therefore, the RLC and MAC layers may be combined with each other or similar functions of the RLC and MAC layers may be combined with each other for higher performance packet processing in the 5G. Alternatively, a specific network function may be removed or not be used as if the concatenation function of the RLC layer is not used. The CU 402 may be designed in a virtualized form as a software module on large capacity/high performance general purpose BS hardware. The whole or some of functions of the RRM may be implemented only in the CU 402 or may be implemented in both of the CU 402 and the DU 405.

An O&M function device (gNB-OM) for managing the BS may be separated. The gNB-OM device may be connected to both of the CU 402 and the DU 405 for heterogeneous vendor mutual operability between the CU 402 and the DU 405. Alternatively, the O&M function device (gNB-OM) may be connected to only one device of the CU 402 and the DU 405 and may be operated to be linked to other disconnected devices through a CU-DU control interface.

As described above, an open type fronthaul interface F1 is a point-to-point logical interface between the CU and the DU, exchanges signaling information, and performs a data transfer. UP data may be transmitted through a general packet radio service tunneling protocol UP/user datagram protocol (GTP-U/UDP) transmission protocol, and an F1AP message may be transmitted through a transmission protocol such as a stream control transmission protocol (SCTP).

Hereinafter, the DL message transmitted from the CU to the DU through the fronthaul interface and the UL message received from the DU will be described in more detail by dividing the DL message and the UL message according to types thereof.

First Embodiment: RRC Message Transfer Procedure

Figure 5:
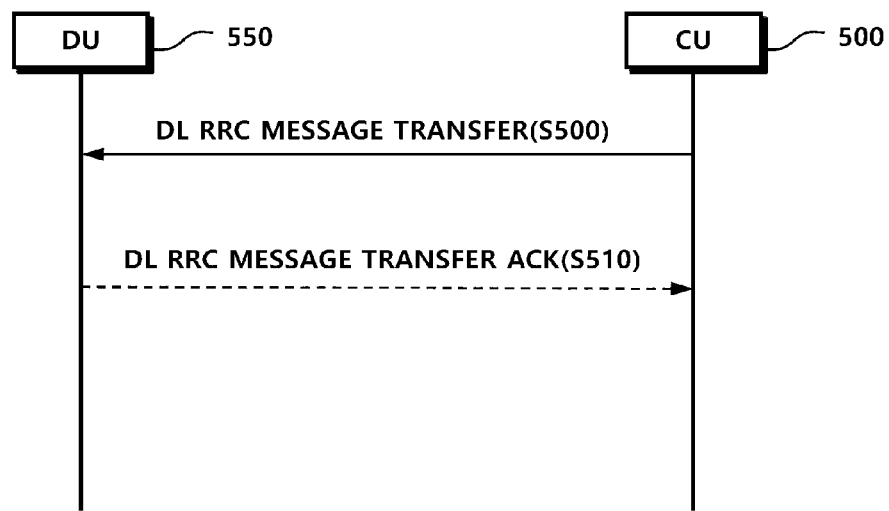
FIG. 5 is a diagram illustrating a transmission and reception procedure of a downlink radio resource control (RRC) message transfer message according to an embodiment.

FIG. 5 is a diagram illustrating a transmission and reception procedure for a DL RRC message transfer message according to an embodiment.

Referring to FIG. 5, a DL message transmitted from a CU 500 to a DU 550 may include an RRC message desired to be transferred to a terminal. An RRC means a 5G RRC or an LTE RRC according to a network structure, such as a non-standalone (NSA), in which an LTE BS and a 5G BS are connected to an evolved packet core (EPC) network or a standalone network in which the 5G BS is connected to a 5G CN and is independently configured.

For example, the CU 500 may transmit the DL RRC message transfer message including the RRC message configured of the DL PDCP PDU to the DU 550 (S500). The RRC message may be encapsulated through a container and may be transferred. In this case, the DU 550 transmits the RRC message of the encapsulated RRC container to the terminal through the wireless interface.

For example, the CU 500 transmits an RRC message transfer (DL) message to the DU 550 by including RRC message information desired to be transmitted. The message of operation S500 may be transmitted through an F1-C interface.

For example, the DL RRC message transfer message may include at least one of CU terminal F1AP ID information for identifying a terminal on the fronthaul interface in the CU, DU terminal F1AP ID information for identifying the terminal on the fronthaul interface in the DU, and an RRC container including radio bearer ID information and message information transmitted to the terminal.

The DU 550 may inform that the RRC message is normally received by transmitting a DL RRC message transfer acknowledge message to the CU 500 (S510) when it needs. However, in a case where a response is not required, the response message of operation S510 may be omitted.

Figure 6:
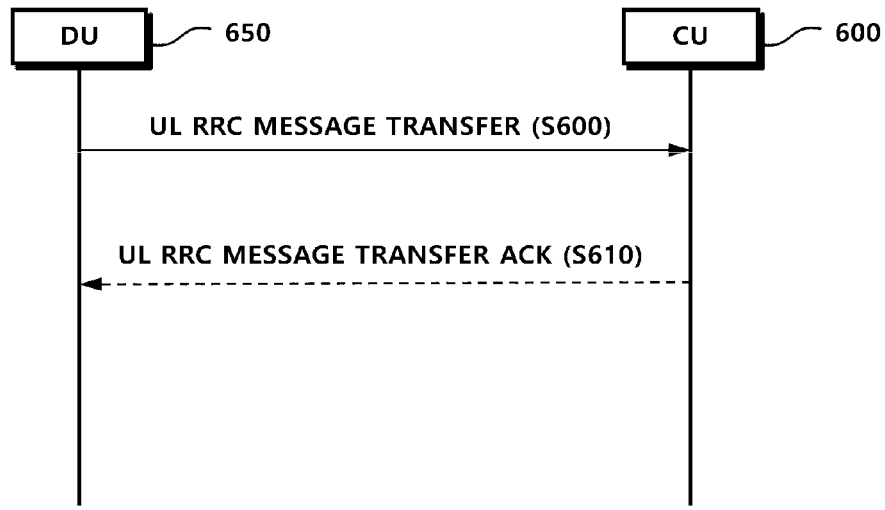
FIG. 6 is a diagram illustrating a transmission and reception procedure of an uplink RRC message transfer message according to an embodiment.

FIG. 6 is a diagram illustrating a transmission and reception procedure of a UL RRC message transfer message according to an embodiment.

Referring to FIG. 6, a DU 650 receiving the RRC message from the terminal may transmit the UL RRC message transfer message including corresponding message information to a CU 600.

For example, the UL RRC message transfer message means a message for receiving, by the CU 600, an RRC message configured of an UL PDCP PDU from the DU 650 through an F1AP. For example, the UL RRC message transfer message may include at least one of CU terminal F1AP ID information for identifying a terminal on the fronthaul interface in the CU, DU terminal F1AP ID information for identifying the terminal on the fronthaul interface in the DU, and an RRC container including radio bearer ID information and message information received from the terminal.

The CU 600 may inform that the RRC message is normally received by transmitting an UL RRC message transfer acknowledge message to the DU 650 as occasion demands. However, in a case where a response is not required, the corresponding response message may be omitted. Here, as a transmission bearer, a data bearer or a signaling bearer may be used.

In addition, the UL/DL RRC message transfer message described with reference to FIGS. 6 and 7 may include at least one of the following pieces of information. That is, an information element (IE) used in a corresponding RRC message may include at least one of the following pieces of information.

CU UE F1AP ID: identifier information for identifying a terminal connection on the F1 interface in a corresponding CU.

DU UE F1AP ID: identifier information for identifying a terminal connection on the F1 interface in a corresponding DU.

NG-RAN split ID: identifier information for indicating a BS split structure.

CU type ID: identifier information for indicating a CU node structure.

DU type ID: identifier information for indicating a DU node structure.

CU ID: CU identifier information.

DU ID: DU identifier information.

Cell ID: cell identifier information.

Global gNB ID: The global gNB ID is global BS (gNB) identifier information and may be configured of the whole or a part of a combination of the CU ID, the DU ID, and the cell ID.

RRC bearer: The RRC bearer is RRC bearer information to be transmitted and may include the SRB ID or the DRB ID.

E-radio access bearer (E-RAB) ID: The E-RAB ID is radio bearer identifier information and may include the SRB ID or the DRB ID.

NG-RAN common gateway interface (CGI): BS cell global identifier information.

CU group ID: identifier information for identifying a group configured of one or more CUs.

DU group ID: identifier information for identifying a group configured of one or more DUs.

Master CU ID: The master CU ID is master CU identifier information and is information indicating a main CU node for controlling a corresponding DU in the CU group.

Master DU ID: The master DU ID is master DU identifier information and is information indicating a main DU node for controlling other DUs in the DU group.

UE radio capability: The UE radio capability is division information for a radio capability of the terminal, and may include a value indicating whether 5G, eLTE, LTE, and the like are supported.

GTP-tunnel ID (GTP-TEID): information indicating that the whole or some of a gNB TEID, a CU TEID, and a DU TEID are used.

Slice ID: identifier information for identifying a network slicing.

QFI: identifier information for identifying a QoS flow.

NG-RAN QoS parameter: information on a QoS parameter of the BS.

Meanwhile, as described with reference to FIG. 1, the CU may transmit a message to the DU through the F1-U interface as well as the F1-C interface. Hereinafter, a procedure of transferring the RRC message through the F1-U interface will be described.

Figure 7:
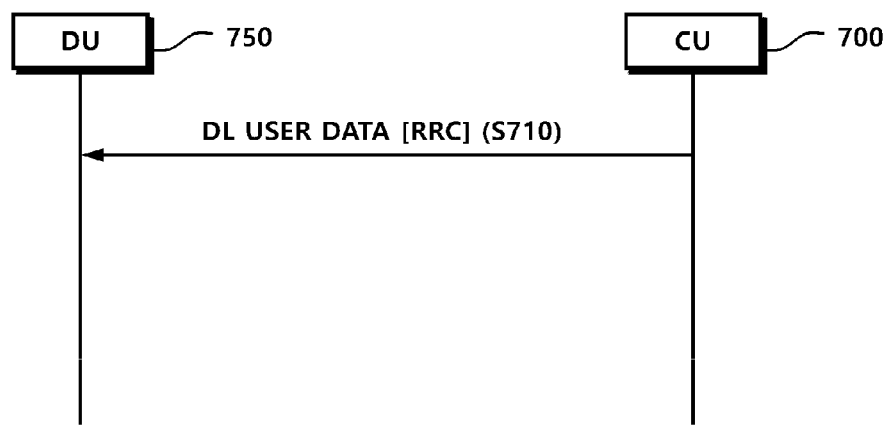
FIG. 7 is a diagram illustrating a downlink RRC message transmission procedure through an F1-U interface according to an embodiment.
Figure 8:
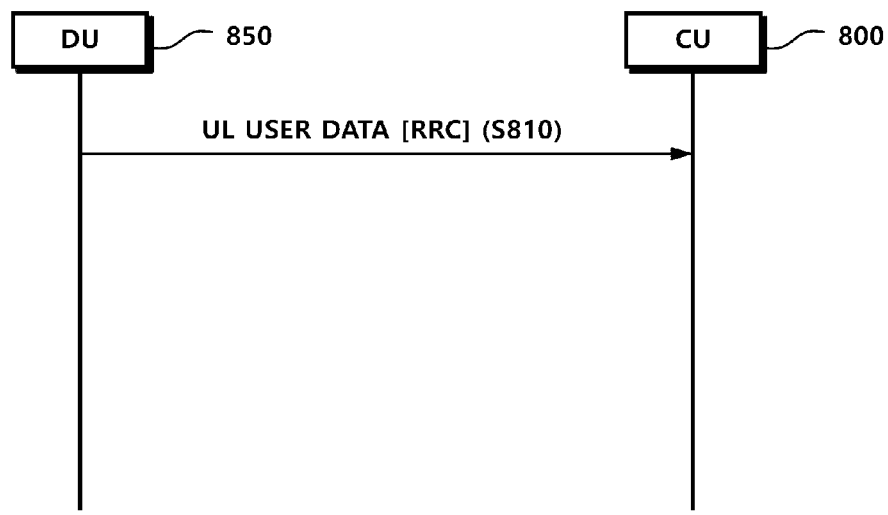
FIG. 8 is a diagram illustrating an uplink RRC message transmission procedure through the F1-U interface according to an embodiment.

FIG. 7 is a diagram illustrating a DL RRC message transmission procedure through a F1-U interface according to an embodiment. FIG. 8 is a diagram illustrating an UL RRC message transmission procedure through a F1-U interface according to an embodiment.

Referring to FIG. 7, a CU 700 may transmit UP data to a DU 750 through a F1-U interface (S710). In this case, the RRC message may be transferred by including the RRC message in a DL user data message. Here, as a transmission bearer, a data bearer or a signaling bearer may be used. In addition, in the case of the F1-U interface, as a transmission protocol, a GTP-U/UDP may also be used together with an SCTP.

Referring to FIG. 8, a DU 850 may transmit UP data received from the terminal to a CU 800 through the F1-U interface (S810). In this case, the RRC message may be transferred by including the RRC message in an UL user data message. Here, as a transmission bearer, a data bearer or a signaling bearer may be used. In addition, in the case of the F1-U interface, as a transmission protocol, a GTP-U/UDP may also be used together with an SCTP.

Figure 9:
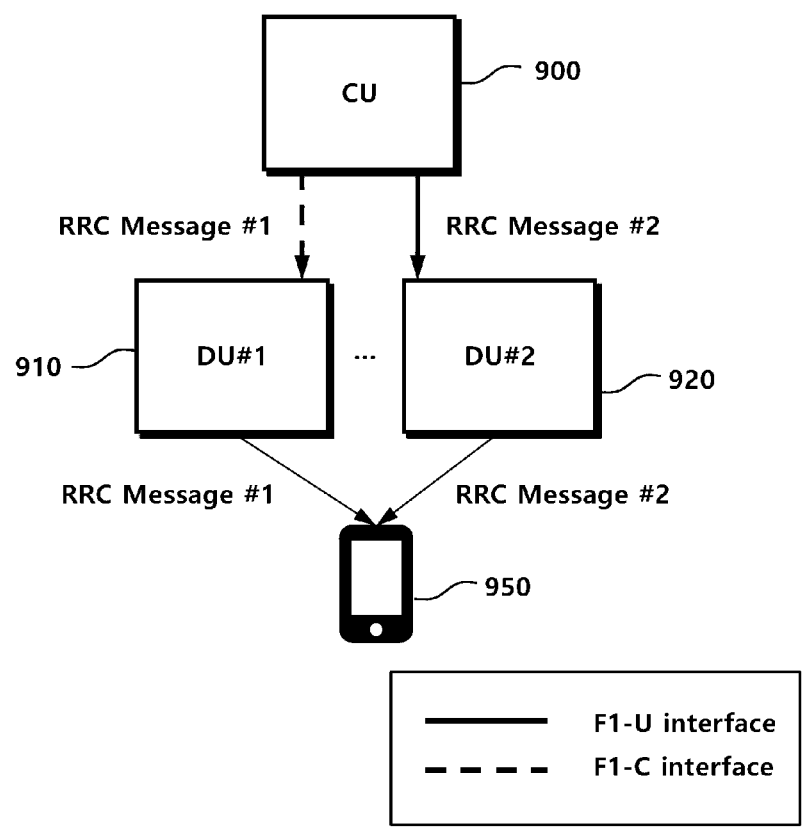
FIG. 9 is a diagram illustrating an example of an RRC message downlink transmission through an F1-C interface and the F1-U interface according to an embodiment.

FIG. 9 is a diagram illustrating an RRC message DL transmission through a F1-C interface and a F1-U interface according to an embodiment.

Describing again with reference to FIG. 9, a CU 900 may transfer an RRC message to DUs 910 and 920 using the F1-C interface and the F1-U interface. Of course, as described above, even the UL RRC message transfer message may be transferred through the F1-C interface and the F1-U interface.

Meanwhile, in the case of the RRC message, an interface for transferring the RRC message may be determined according to various reasons and condition settings. For example, the CU 900 or the DUs 910 and 920 may dynamically select the F1-C interface or the F1-U interface to transmit the message based on at least one information among an RRC message type, a priority, a QoS parameter, a radio access technology (RAT) type, a usage bearer type (for example, SRB0, SRB1, SRB2, or the like), interface transmission quality (an error rate, a delay degree, a speed, and the like), network slicing information, and transmission load information.

Alternatively, an interface that is preset based on the above-described information may be statically selected. Alternatively, as occasion demands, individual or simultaneous transmission using both of the F1-C interface and the F1-U interface may be possible.

Specifically, the CU 900 may transmit an RRC message #1 to a DU #1 910 through the F1-C interface, and the DU #1 910 may transmit the RRC message #1 to a terminal 950 through the wireless interface. Alternatively, the CU 900 may transmit an RRC message #2 to a DU #2 920 through the F1-U interface, and the DU #2 920 may transmit the RRC message #2 to the terminal 950 through the wireless interface.

Although an example of the DL RRC message is shown in FIG. 9, the UL RRC message may be equally applied like that in FIG. 9.

Second Embodiment: Paging Message Transfer Procedure

The CU may transmit the paging information to the DU through the above-described fronthaul interface. Then, the DU receiving the paging information transmits the paging information to the terminal in a paging area. Therefore, paging information transmissions based on both of a CN and a BS are possible. The paging information based on the CN means that a paging message is transmitted by initiating the terminal to perform a paging to the CN. The paging information transmission based on the BS means a RAM initiation paging that initiates the BS to perform a paging.

Figure 10:
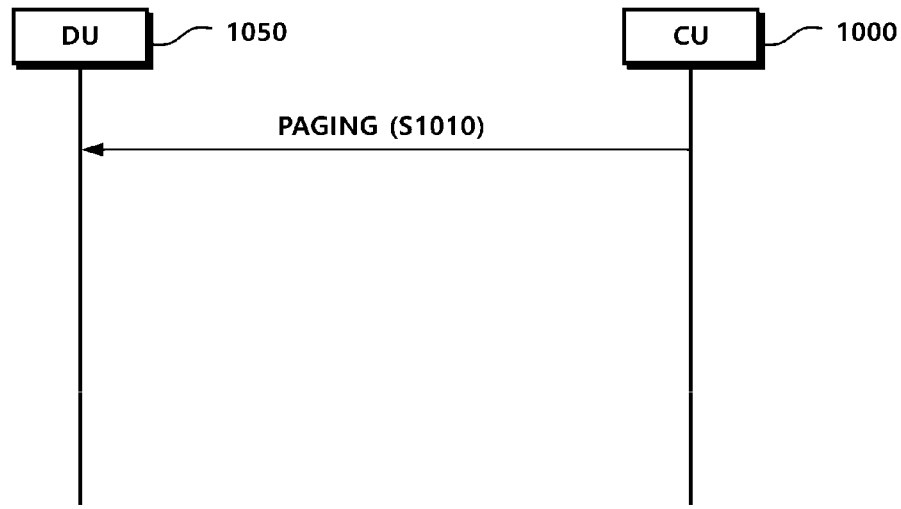
FIG. 10 is a diagram illustrating a paging information transmission procedure through the F1-C interface according to an embodiment.

FIG. 10 is a diagram illustrating a paging information transmission procedure through a F1-C interface according to an embodiment.

Referring to FIG. 10, a CU 1000 may transmit the paging information to a DU 1050 through the fronthaul interface (S1010). For example, the fronthaul interface may mean the F1-C interface.

For example, the paging information may include information for causing the DU 1050 to perform a paging procedure on a terminal in a cell indicated in paging cell list information.

For example, the paging information may include at least one of terminal identity index value (UE identity index value) information for calculating a paging frame, terminal paging identity information for identifying the terminal in a RAN (for example, the BS) (RAN UE paging identity information), CN terminal paging identity information for identifying the terminal in a CN (CN UE paging identity information), and the paging cell list information. As another example, the paging information may include at least one of the following IEs. In addition, the paging information may further include at least one IE among the RRC message IEs described above.

- UE identity index value: information used in paging frame calculation.
- RAN UE paging identity: identifier information for distinguishing a terminal receiving the paging in the BS.
- CN UE paging identity: identifier information for distinguishing a terminal receiving the paging in the CN.
- Paging domain: information distinguishing and identifying a CN-based or
- RAN-based paging.
- Tracking area identifier (TAI): CN-based TAI information.
- List of TAIs: CN-based TAI list information.
- RAN-TAI: RAN-based TAI information.
- List of RAN-TAIs: RAN-TAI list information.
- UE radio capability for paging: terminal wireless capability information related to the paging.
- Paging cell list: cell list information for the paging.

In a case where a paging message is received, the DU 1050 performs the paging on terminals in a cell belonging to a tracking area (TA) (or a RAN-TA) displayed in the TAI (or the RAN-TAI) list. In addition, the paging information and identifier based on the CN and the BS (RAN) may be distinguished according to the above-described paging domain information.

Third Embodiment: System Information Transfer Procedure

The CU may transfer system information to the DU through the above-described fronthaul interface.

For example, the CU may transmit a system information transfer instruction message for instructing the DU to broadcast the system information to the DU through the F1-C interface or the F1-U interface. The CU transmits the corresponding system information transfer instruction message to the DU, and thus the CU starts a procedure of transmitting the system information to the inside of the cell.

The DU may broadcast or unicast the corresponding system information to the inside of the cell indicated based on the received system information transfer instruction message. The transmitted system information may be a master information block (MIB), a slave information block (SIB), or other SIBs.

The names of the information included in each message and each IE described above with reference to FIGS. 1 to 10 are examples, and in the present disclosure, the names are not limited. That is, a message including a corresponding function and information is included in the IE or the message described above regardless of the term thereof.

As described above, according to the embodiments, the fronthaul interface may be designed inside the 5G BS in a standard-based open type in a situation in which many small cell BSs are required to stably provide high frequency band, high transmission speed, high reliability, and low delay degree requirements and various services. Therefore, in accordance with the embodiments, more stable network connectivity can be provided by an efficient linkage between the 5G CU and DU BSs and reduction of construction/operation cost can be provided.

In accordance with at least one embodiment, the CU will be schematically described with reference to FIG. 11.

Figure 11:
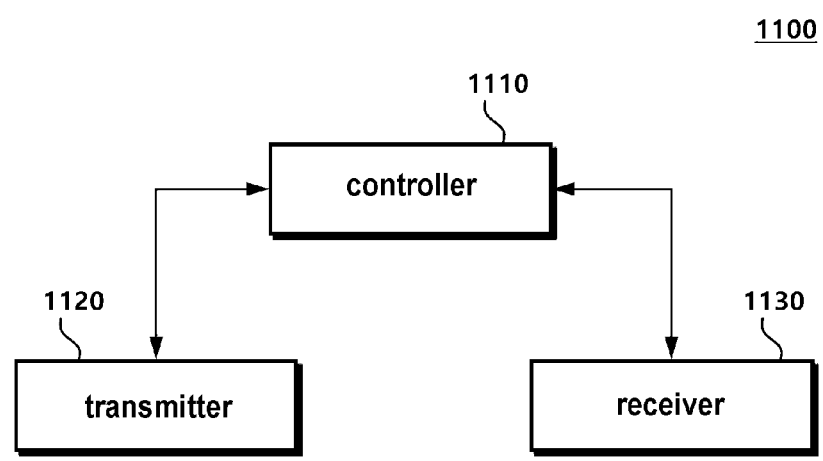
FIG. 11 is a diagram illustrating a CU according to an embodiment.

FIG. 11 is a diagram illustrating a CU according to an embodiment.

Referring to FIG. 11, a CU 1100 may be a constituent element of a BS that transmits and receives a message. Such a CU 1100 may include a controller 1110 configured to generate a DL message to be transmitted to one or more DUs associated with the CU 1100, a transmitter 1120 configured to transmit the DL message to the one or more DUs through a fronthaul interface, and a receiver 1130 configured to receive an UL message from the one or more DUs through the fronthaul interface.

For example, the controller 1110 may generate the DL message to be transmitted to the terminal. As described above, in a case where the BS has a split structure of the CU 110 and at least one DU, the CU 1100 should transmit the DL message to the terminal through the DU. Therefore, the CU 1100 may generate the DL message to be transmitted to the one or more DUs configuring the BS in association with the CU 1100.

For example, in a case where the CU 1100 is configured in association with the DU, the transmitter 1120 transfers the DL message to the DU through the fronthaul interface, and the DU transfers the DL message to the terminal through the wireless interface. For example, the DL message may be transferred to the DU through the F1 interface.

For example, the DL message may be an RRC message transfer message for transmitting an RRC message to the terminal. For example, the transmitter 1120 may transmit a DL RRC message transfer message for transferring an RRC message configured of a DL PDCP PDU to the DU through an F1AP.

For example, the DL RRC message transfer message may include at least one of CU terminal F1AP ID information for identifying a terminal on the fronthaul interface in the CU, DU terminal F1AP ID information for identifying the terminal on the fronthaul interface in the DU, and an RRC container including radio bearer ID information and message information transmitted to the terminal. The radio bearer ID information may be an SRB ID or a DRB ID. For example, the above-described information included in the DL RRC message transfer message may be included in an RRC container IE and may be transferred. In this case, the DU may transmit the received RRC container information to a terminal having an identifier indicated by the DL RRC message transfer message to transmit the RRC message to the terminal.

As another example, the DL message may include paging information for causing the DU to perform a paging procedure on a terminal in a cell indicated in paging cell list information. For example, the paging information may include at least one of terminal identity index value (UE identity index value) information for calculating a paging frame, terminal paging identity information for identifying the terminal in a RAN (RAN UE paging identity information), CN terminal paging identity information for identifying the terminal in a CN (CN UE paging identity information), and the paging cell list information. In this case, the DU may transmit a paging message to the terminal through the cell indicated by the paging cell list information using the received DL message.

As still another example, the DL message may be a system information transfer instruction message for instructing the DU to broadcast system information. In this case, the DU may broadcast the system information to the inside of the cell according to the system information transfer instruction message.

In addition, the receiver 1130 may receive a check response message for the DL message from the DU. Also, the transmitter 1120 may transmit a check response message for the UL message to the DU.

In addition, the receiver 1130 may receive the UL message from the DU. The UL message may include an UL RRC message transfer message for receiving an RRC message configured of an UL PDCP PDU from the DU through the F1AP. For example, the UL RRC message transfer message may include at least one of CU terminal F1AP ID information for identifying a terminal on the fronthaul interface in the CU, DU terminal F1AP ID information for identifying the terminal on the fronthaul interface in the DU, and an RRC container including radio bearer ID information and message information received from the terminal. The radio bearer ID information may include an SRB ID or a DRB ID to which the corresponding RRC message is transferred.

In addition, the controller 1110 configures the fronthaul interface between internal CU and DU devices configuring the 5G BS that is necessary for performing the present embodiments described above, and controls overall operations of the CU 1100 according to the transmission and reception of the message through the fronthaul interface.

In addition, the transmitter 1120 and the receiver 1130 are used in transmitting and receiving the RRC message, the system information, the paging information, a signal, data, and the like to be transmitted to the terminal through the F1 interface that is necessary for performing the present embodiments described above to and from the DU or a CN entity.

Standard contents or standard documents described in the above-described embodiments is omitted for simplifying the description of the specification and configures a part of the present specification. Therefore, it is to be construed that adding the standard contents and some contents of the standard documents to the present specification or describing the standard contents and some contents of the standard documents in the claims corresponds to the scope of the present disclosure.

The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of transmitting and receiving a message by a central unit (CU) of a base station, the method comprising:
    generating a downlink (DL) message to be transmitted to one or more distributed units (DUs) associated with the CU;
    transmitting the DL message to the one or more DUs through a fronthaul interface; and
    receiving an uplink (UL) message from the one or more DUs through the fronthaul interface,
    wherein the DL message is a DL radio resource control message transfer message for transmitting an RRC message configured of a DL packet data convergence protocol (PDCP) protocol data unit (PDU) to the one or more DUs through an F1 application protocol (F1AP), and
    wherein the DL RRC message transfer message includes at least one of CU user equipment (UE) F1AP identification (ID) information for identifying a UE on the fronthaul interface in the CU, DU UE F1AP ID information for identifying the UE on the fronthaul interface in the one or more DUs, and an RRC container including radio bearer ID information and message information transmitted to the UE.

2. The method of claim 1, wherein the CU and the one or more DUs are constituent elements of the base station,
    the CU is configured to perform at least one network function among radio resource control (RRC), packet data convergence protocol (PDCP), radio link control (RLC), and multiplexed analog components (MAC) network functions, and
    the DU is configured to perform at least one network function among RLC, MAC, and physical layer protocol (PHY) network functions.

3. The method of claim 1, wherein the UL message is an UL radio resource control (RRC) message transfer message for receiving an RRC message configured of an UL packet data convergence protocol (PDCP) protocol data unit (PDU) from the DU through an F1 application protocol (F1AP).

4. The method of claim 3, wherein the UL RRC message transfer message includes at least one of CU UE F1AP ID information for identifying a UE on the fronthaul interface in the CU, DU UE F1AP ID information for identifying the UE on the fronthaul interface in the one or more DUs, and an RRC container including radio bearer ID information and message information received from the UE.

5. The method of claim 1, wherein the DL message includes paging information for causing the DU to perform a paging procedure on a UE in a cell indicated in paging cell list information.

6. The method of claim 5, wherein the paging information includes at least one of UE identity index value information for calculating a paging frame, UE paging identity information for identifying the UE in a radio access network (RAN) (RAN UE paging identity information), core network (CN) UE paging identity information for identifying the UE in a CN (CN UE paging identity information), and the paging cell list information.

7. The method of claim 1, wherein the DL message is a system information transfer instruction message for instructing the one or more DUs to broadcast system information.

8. A central unit (CU) of a base station that transmits and receives a message, the CU comprising:
- a controller configured to generate a downlink (DL) message to be transmitted to one or more distributed units (DUs) associated with the CU;
- a transmitter configured to transmit the DL message to the one or more DUs through a fronthaul interface; and
- a receiver configured to receive an uplink (UL) message from the one or more DUs through the fronthaul interface,
- wherein the DL message is a DL radio resource control (RRC) message transfer message for transferring an RRC message configured of a DL packet data convergence protocol (PDCP) protocol data unit (PDU) to the one or more DUs through an F1 application protocol (F1AP), and
- wherein the DL RRC message transfer message includes at least one of CU user equipment (UE) F1AP ID information for identifying a UE on the fronthaul interface in the CU, DU UE F1AP ID information for identifying the UE on the fronthaul interface in the one or more DUs, and an RRC container including radio bearer identification (ID) information and message information transmitted to the UE.

9. The CU of claim 8, wherein the CU and the one or more DUs are constituent elements of the base station,
- the CU is configured to perform at least one network function among radio resource control (RRC), packet data convergence protocol (PDCP), radio link control (RLC), and multiplexed analog components (MAC) network functions, and
- the DU is configured to perform at least one network function among RLC, MAC and physical layer protocol (PHY) network functions.

10. The CU of claim 8, wherein the UL message is an UL radio resource control (RRC) message transfer message for receiving an RRC message configured of an UL packet data convergence protocol (PDCP) protocol data unit (PDU) from the DU through an F1 application protocol (F1AP).

11. The CU of claim 10, wherein the UL RRC message transfer message includes at least one of CU UE F1AP ID information for identifying a UE on the fronthaul interface in the CU, DU UE F1AP ID information for identifying the UE on the fronthaul interface in the one or more DUs, and an RRC container including radio bearer ID information and message information received from the UE.

12. The CU of claim 8, wherein the DL message includes paging information for causing the one or more DUs to perform a paging procedure on a UE in a cell indicated in paging cell list information.

13. The CU of claim 12, wherein the paging information includes at least one of UE identity index value information for calculating a paging frame, UE paging identity information for identifying the UE in a radio access network (RAN) (RAN UE paging identity information), core network (CN) UE paging identity information for identifying the UE in a CN (CN UE paging identity information), and the paging cell list information.

14. The CU of claim 8, wherein the DL message is a system information transfer instruction message for instructing the one or more DUs to broadcast system information.

* * * * *